UNITED STATES PATENT OFFICE 2,529,985

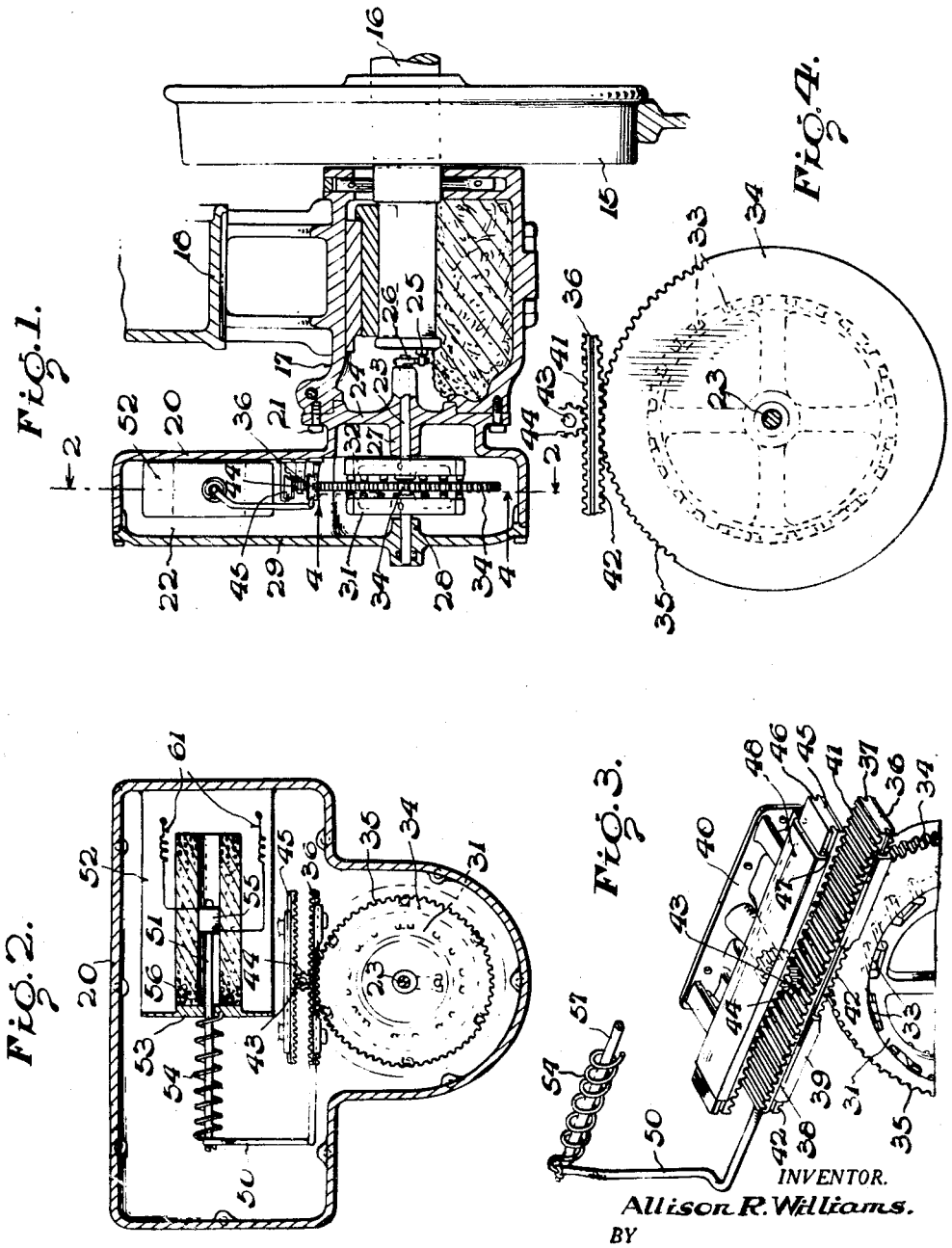

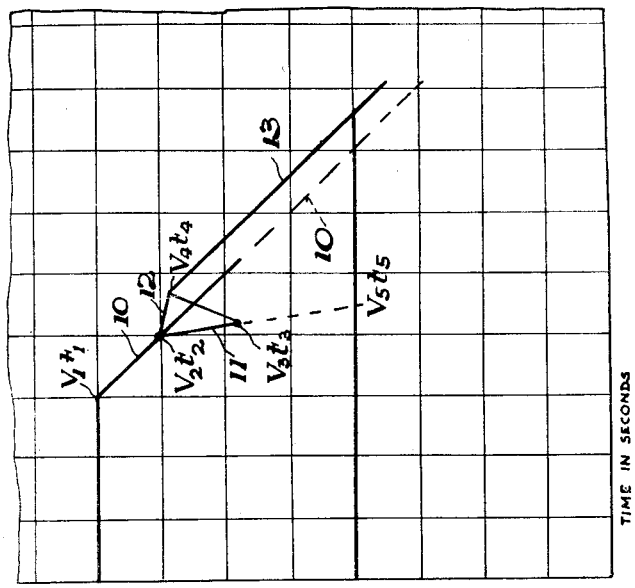
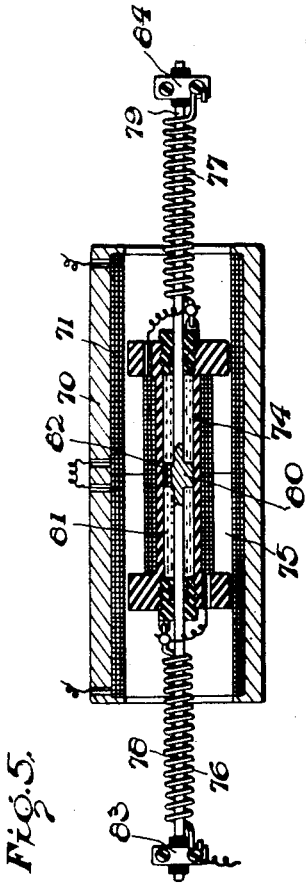

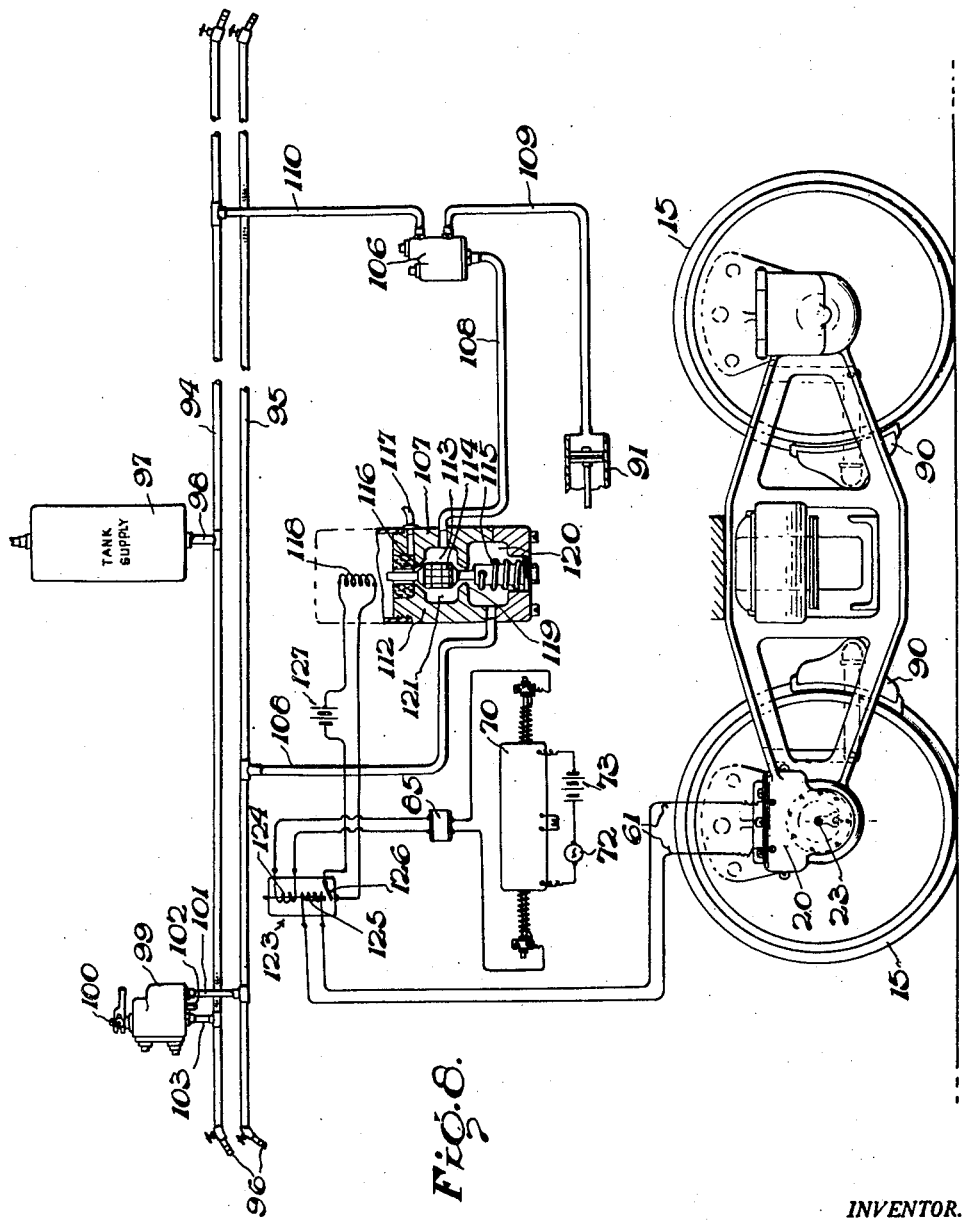

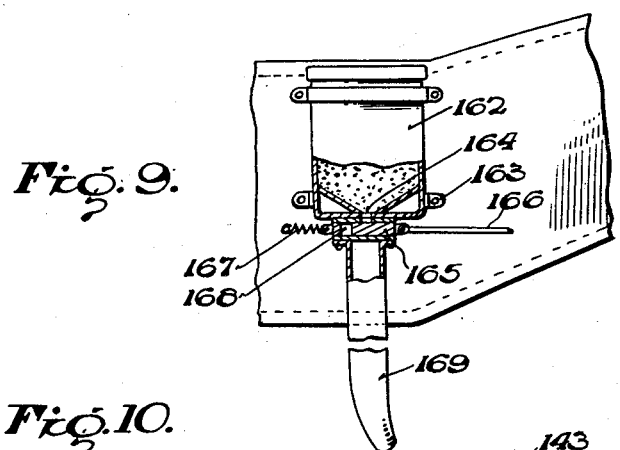
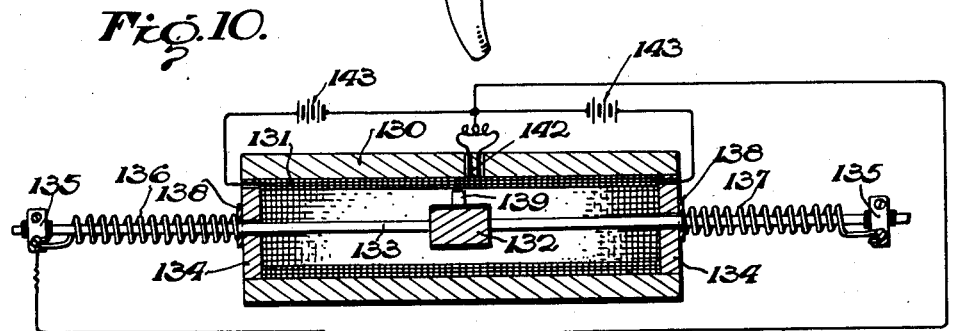
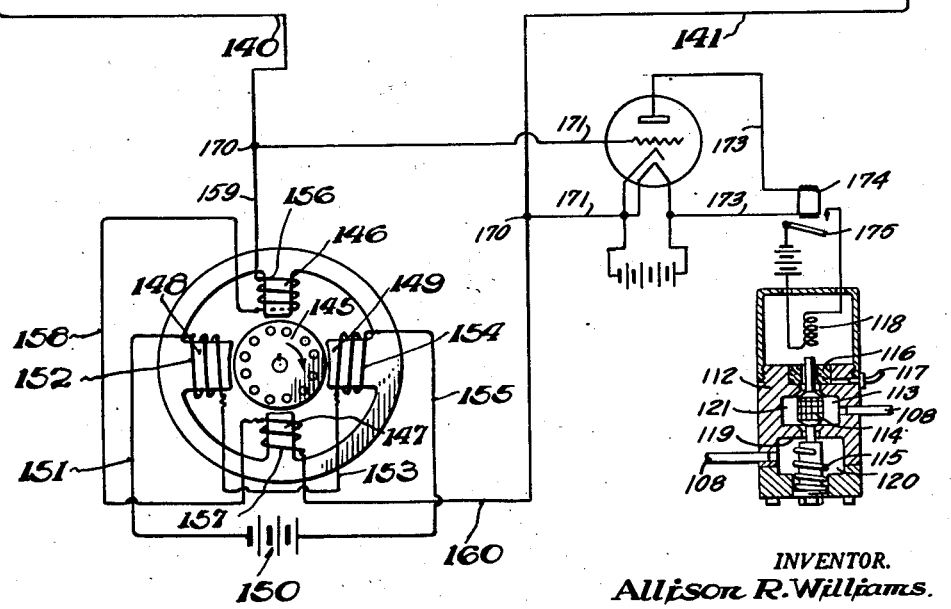

DECELERATION BRAKE CONTROL

Allison R. Williams, Washington, D. C.

Application May 9, 1949, Serial No. 92,170

21 Claims. (Cl. 188—181)

This invention relates to methods and systems for controlling rotating bodies or bodies mounted on rotating elements as wheels, the present application being a continuation-in-part of my application Serial No. 620,377, now abandoned, filed October 4, 1945 for Braking Systems. More particularly the present invention relates to the control of the acceleration or deceleration of a rotating body by reference to its actual acceleration or deceleration to and comparison with the acceleration or deceleration of rotation existing when there is no slipping or to a corresponding acceleration or deceleration of translation.

In the case of wheeled vehicles, the present invention relates to a method and system for maintaining constant rolling contact between the wheels of the vehicle and the surfaces with which they have contact. More particularly still the present invention relates to the provision in a braking system of means for minimizing slippage between the wheels of a vehicle and the surfaces with which they have rolling contact following application of the brakes.

The invention is exemplified by reference to its application to the braking systems of railway vehicles, but it is to be expressly understood that the invention is not restricted to such applications, as it is applicable to the braking systems of automotive vehicles and other vehicles, as well as to other rotating bodies such as the rolls in rolling mills, paper mills, and other mills, where it is desired to control relative accelerations or decelerations at the same magnitude or at some constant differential or to maintain a previously planned pattern of differences. As applied to braking systems the invention may be embodied in systems powered by any suitable source of energy, and to systems of any suitable type for developing or transmitting the braking effort, as pneumatic, hydraulic, electrical or mechanical systems.

Present conventional braking systems fail to make proper allowance for the fact that the coefficient of adhesion between a wheel and the surface contacted thereby, may be, and often is, at any given instant quite different for the several wheels of the vehicle as well as being different at successive times and under different conditions. It is true that, with so called equalized brakes, as in known air, hydraulic, or mechanical systems used on vehicles, the braking effects of all the wheels are equalized to a high degree of precision (without introducing unbalanced lateral forces) so long as the friction between the wheel and its contacting surface is greater than the brake friction applied, that is, so long as there is no wheel slipping. However, as soon as the brake friction force exceeds the friction force acting tangentially to the wheel between any wheel and its contacting surface that wheel tends to decelerate more rapidly than occurs while proper rolling contact is maintained. This leads to wheel locking and sliding, causing the wheels of a railway vehicle to slide on the rails, with resultant flat surface on portions of the treads, and causing an automotive vehicle to skid and swirl if the brakes are being continuously applied.

Taking the case of automotive brakes, even though equally applied, if the brakes on one side effectively decelerate the vehicle and are not effective on the other side of the vehicle due to insufficient surface friction between the wheels and the road, there results an unbalanced couple tending to turn the vehicle about its vertical axis. This situation frequently causes collisions with tragic consequences.

It is an object of this invention to provide a method and system wherein the proper instant of release of the brakes and of re-establishing brake application is determined automatically, so as to discontinue brake application with the utmost promptness after slipping commences and to reapply the brakes with equal promptness after slipping ceases.

It has heretofore been proposed to provide braking systems with mechanism responsive to rotary inertia to effect an automatic release of the brakes after slippage starts and reapplication of the brakes upon reacceleration of the wheels. Devices of this character as heretofore proposed, however, have not only been highly complex, but they have been open to the objection that they fail to respond accurately or consistently after slipping starts under varying conditions because they depend on a predetermined amount of angular deceleration or a predetermined lapse of time having first occurred. Such proposed provisions not only fail to act instantaneously at the beginning of slippage, but as they depend on certain assumed conditions, determined experimentally or empirically, their response is rarely, if ever, consistent with the actual conditions, because such assumed conditions will seldom be duplicated exactly owing to the infinite variety of conditions of friction that may exist when the brakes are applied.

Another object of this invention is to provide a method and system for automatically releasing and reapplying the brakes which is activated by the instantaneous conditions of deceleration whenever slippage starts whatever the speed of the vehicle and whatever the then existing deceleration.

It is another object of this invention to provide a braking system with means for automatically releasing and reapplying the brakes which is of such simplicity that it can be readily incorporated in any braking system.

For any given speed of translation for a wheel on a vehicle there is a proportional angular velocity for that wheel if there is no slipping. If any one wheel begins to slip its angular velocity is less than that which corresponds to its then speed of translation. During such period of time the angular deceleration of this slipping wheel is greater than normal. Now, if the slipping of any individual wheel is measured in terms of a comparison between two values, as two electric signals, one of which is proportional to the true deceleration of translation as the standard of reference and which is proportional to the deceleration in angular velocity of the wheel when true rolling, with no creeping or slippage of the wheel, is occurring, and the other of which is proportional to the actual angular deceleration of the wheel (it being understood that these two signals, either or both, may be biased so that an expression $Kx \pm B$ would express their form rather than $Kx$, a simple proportion) the differential value obtained from an analysis of these two values can be used to effect release of the brake when it reaches an amount as small as practically possible to actuate physical elements, but of necessity sufficient in magnitude to actuate the selected means for controlling the operation of the brake.

For example, in fluid operated brakes, a solenoid under the control of a relay actuated by two magneto motive forces obtained as explained above can operate a valve associated with the brake at the slipping wheel to release the pressure, thereby allowing the wheel to re-establish complete rolling contact before it loses any appreciable rotational kinetic energy. This can be accomplished without disturbing the braking on other wheels, except when it is desirable to release simultaneously a brake on the opposite side of the vehicle to maintain constant lateral stability. Hence this automatic control will momentarily release the brake on the slipping wheel (and possibly one of the wheels on the opposite sides of the vehicle) and then promptly reapply the brake as soon as true rolling is re-established so that the operator can continue to decelerate the vehicle under stable and properly equalized conditions maintained automatically.

It is a further object of this invention to provide means of the type last characterized which are highly efficient, of simple construction but strong and durable, and certain in operation.

Furthermore, in coaction with the mechanism for so effecting momentary release of the brakes, mechanism may be provided so that the same means which releases the brake will concurrently release friction sand or the like, causing some of it to be applied on the surface in front of the rolling wheel. This provision may also be made effective if slipping occurs during acceleration of a wheel and it may be used independently of the brake system.

Another object of this invention is therefore to provide a braking system as hereinbefore characterized with automatically operating means for increasing the friction between a wheel and its contacting surface simultaneously with the automatic release of a brake, i. e., at the beginning of slipping of any wheel.

Other objects will appear as the description of this invention proceeds.

The invention is capable of receiving a variety of mechanical expressions only some of which are shown on the accompanying drawings. Therefore it is to be expressly understood that the drawings are for purposes of illustration only and are not to be construed as a definition of the limits of the invention, reference being had to the appended claims for that purpose.

Referring to the drawings, wherein the same reference characters are used to designate corresponding parts in the several figures, Fig. 1 is a somewhat diagrammatic view illustrating one embodiment of an accelerometer usable in the present invention to determine actual rotary deceleration;

Fig. 2 is a section on the line 2—2 of Fig. 1;

Figs. 3 and 4 are fragmentary views to illustrate details of the device shown in Figs. 1 and 2;

Fig. 5 illustrates one form of accelerometer that may be used for determining vehicle deceleration as a standard signal that is proportional to the true rotary deceleration when no slipping exists;

Figs. 6 and 7 show graphs to aid understanding of the principles involved and the operation of the invention;

Fig. 8 is a somewhat schematic view illustrating an embodiment of the invention as applied to railway brakes;

Fig. 9 is a fragmentary view of a sander that may be used in embodying the present invention; and Fig. 10 illustrates a preferred device used for obtaining the signal proportional to vehicle deceleration as a standard of comparison, and a preferred device used for obtaining the signal proportional to actual rotary deceleration of a wheel, and shows schematically another way of combining the signals.

Referring first to the involved principles, whenever the tangential force at the surface of contact between a wheel and the surface on which it is rolling becomes less than the tangential force due to the brake which is being applied, slipping begins. This process may be progressive because, as wheel slipping increases, the friction between the wheel and the surface of contact may become still less, while brake friction becomes greater, thereby causing effects which follow in rapid succession with the result that the angular velocity of the wheel approaches zero very rapidly. Fig. 7 illustrates the above action of a wheel rotating at angular velocity $v1$. Assume that at time $t1$ a brake is applied. Both the vehicle and the wheel then decelerate as shown by the sloping line 10. If at $v2$, $t2$ slipping of the wheel begins, it loses velocity very rapidly, decelerating along line 11 at a greater rate until, in a very short period of time, if the brake is not released, the wheel is locked at time $t5$ when $v5$ equals zero. The time for the wheel to decelerate until it reaches a velocity equal to zero may be readily calculated—for a railway wheel rotating at a rotary speed corresponding to a train speed of 50 M. P. H. when slipping begins, the time for it to decelerate to zero is a small fraction of a second.

There is also a peculiar characteristic of braking friction that is worthy of note. It can be shown empirically that with a constant brake pressure applied to the brake shoe during braking of a vehicle from a high speed to a stop, the coefficient of friction between the wheel and brake does not remain at a constant value during the total deceleration period of the vehicle and therefore during the period of time when the brake is being applied. This condition similarly applies for different brake pressures, and a general tendency can be noted, to wit, that at low velocities the tendency is for the value of the coefficient of friction to be greater than at higher velocities. This means that during the time a vehicle is being braked to a stop, in order to effect the shortest stopping time, this variable friction has to be taken into consideration. The forces to be balanced in order to effect maximum braking are those at the brake shoe and at the rail. As these act in opposite directions on the wheel itself, the optimum condition is to have them exactly equal. Under this condition the maximum braking force is being applied to the vehicle and the wheel is not slipping. In contemporary systems the braking pressure maintained on the shoe is of a constant value, and with the antislip devices heretofore proposed it is changed if the wheel begins to slip. It is apparent that the utmost efficiency is never reached, however, because the original pressure applied might not cause slipping at the higher speed, while at lower speeds this same application of pressure would cause the braking force to exceed the frictional force of the rail and slipping would occur. In other words, these prior systems of control of necessity are not flexible enough to take into effect a constantly varying function such as here exists. The present invention, as will more fully appear hereinafter, provides a system of control that automatically takes this varying function into consideration, just as it does any other variable condition, such as may exist at the rail itself, thereby effecting superior braking effects because operation depends on a differential value and not on any variation in the causes effecting the values involved.

As will be apparent from the foregoing analysis of the principles, the method and system of the present invention involve the use of a comparison of signals from two devices responsive to changes in speed, which devices will herein be characterized as accelerometers, whether responding to positive or negative acceleration, i. e., decelartion. To carry into effect the foregoing principles one of said accelerometers responds to the translational deceleration of the wheel or other rotating body in its motion of translation and therefore to the angular deceleration of the wheel in its motion of rotation which corresponds to that value which exists as long as complete rolling contact is being maintained between the wheel and its contacting surface, while the other accelerometer is made to respond to the actual angular deceleration of the wheel under the existing tread and contact surface conditions. These decelerations will be respectively herein referred to as the normal angular deceleration and the actual angular deceleration. Signals, such as indications of magnetomotive force, from said two accelerometers are compared to determine if there is any existing differential over and above any bias that may be imposed when the values are equal, and upon the occurrence of any such differential that may be used to actuate suitable controlling mechanism, such differential becomes effective to initiate the controlling function. In this invention it is contemplated that the mechanism responsive to the differential may respond to any departure from a balance of said signals or sources of energy or the mechanism may be biased in a predetermined direction so that upon the occurrence of a differential of predetermined amount the responding mechanism may be actuated although the magnitude of the differential might not itself be sufficient to effect actuation of the responding mechanism with the desired or sufficient promptness.

Any suitable devices may be employed for producing signals as sources of energy respectively responsive to the normal angular deceleration and the actual angular deceleration and it is to be understood that they may be installed to respond to a differential at each wheel, or to appropriately selected wheels, or to suitable groupings of wheels.

Referring first to Figs. 1 to 4, inclusive, one suitable device has been illustrated for producing a source of energy or signal corresponding to the actual deceleration of a wheel and which may be associated with each wheel or selected wheels of the truck of a railway vehicle. As here shown, 15 designates the truck wheel of any suitable railway vehicle, said wheel being mounted on an axle 16 journaled in a journal box 17 of any suitable type and construction and mounted on the frame 18 of the vehicles in any suitable way. Associated with the journal box 17 in any suitable way, and here shown as replacing the usual end cover of the journal box, is a casing 20 for containing the signal generating mechanism which produces a signal or source of energy proportional to the actual rotational deceleration of the wheel, casing 20 being shown as attached to the journal box by suitable bolts and screws 21. While the signal generating mechanism is here illustrated as mounted on the end of the axle, it is to be expressly understood that any other appropriate means for mounting the signal generating mechanism in association with the axle may be used.

Casing 20 is preferably so constructed as to minimize the chance of foreign matter entering the same, and to this end the chamber 22 in said casing is completely sealed except for the passage through the wall thereof of the shaft to be described. Journaled in any suitable way in the wall of the casing 20 is a shaft 23 which protrudes through the inner wall 24 of the casing 20 and is there provided with any suitable means for rotating the shaft 23 in synchronism with the axle 16. As shown, a threaded bolt 25 is mounted in the end of the axle 16 and has appropriate connection with a crank 26 secured in any suitable way on shaft 23. The shaft 23 not only has a suitable bearing 27 in the wall 24 of the housing 20 but it is also provided with a suitable bearing 28 in the opposite wall of said housing, here shown as in the form of a detachable cover section 29.

Secured to the shaft 23 in any suitable way, as by keying, are two wheel-like devices 31 and 32. Each of these wheel-like devices carries around the periphery thereof a plurality of symmetrically arranged U-shaped permanent magnets 33, with the legs of said magnets faced inwardly as illustrated. Said wheel-like devices 31 and 32 are provided with the same number of U-shaped magnets and therefore a symmetrical magnetic field is set up in the air gap between the two sets of inwardly directed magnets. Disposed in this air gap and mounted on the shaft 23 for rotation relatively thereto is a disk 34, here shown as provided with pinion teeth 35 at its periphery although other provisions for moving the rectilinearly movable member to be described from the disk 34 may be used.

Meshing with the teeth 35 on said disk 34 are the teeth 42 of a rectilinearly movable member here shown as a rack 36 mounted in any suitable way for free rectilinear movement in the casing 20, as by providing the edges of the rack with grooves 37 which receive flanges 38 carried by supporting plates 39 projecting inwardly from any suitable bracket member 40 that may be appropriately secured to the wall of the housing 20. Rack 36 is also provided with teeth 41 at its face opposite that carrying the teeth 42, and mounted on a stub shaft 43 carried by the bracket 40 is a pinion 44 meshing with said teeth 41. Also mounted on the bracket 40 for free rectilinear movement thereon is a second rack 45 having teeth in mesh with the teeth of pinion 44. Rack 45 may be supported from the bracket in any suitable way, being shown as having its edges grooved at 46 for cooperation with flanges 47 carried by supporting plates 48 also projecting inwardly from the bracket 40. As illustrated, the racks 36 and 45 are supported in like fashion for linear movement and as both racks are in mesh with pinion 44 they will have equal and opposite movement when rack 36 is driven from the disk 34. By equating the masses of the racks 36 and 45 the effect of inertia is substantially canceled out.

The magnetic field set up by the U-shaped magnets 33 rotating with the wheel-like devices 31 and 32 therefore rotates in synchronism with the wheel axle 16 and eddy currents are set up in the disk 34 such that the magnitude of these currents is proportional to the instantaneous value of the velocity of the pole faces of the magnets with respect to the disk. These currents in turn set up a flux which reacts with the flux set up by the permanent magnets, and thereby a tendency to displace the disk rotationally is set up which at each instant is proportional to the speed of rotation of the rotating magnetic field and therefore proportional to the speed of rotation of the axle 16. Any suitable means may be associated with the disk 34 or the parts associated therewith to impose a progressive resistance to the displacement of said disk.

The torque so developed by the rotating disk 34 is transmitted from the rack 36 through any appropriate element or elements 50 to a rectilinearly movable coil actuating member 51 disposed in the magnetic field of a suitable permanent magnet 52 mounted in any suitable way on the wall of the casing 20. Interposed between the element 50 and the end 53 of said magnet 52 is a coil spring 54 which is preferably connected at its opposite extremities to the element 50 and the end 53 of the magnet so that it may act in tension as well as in compression depending upon the direction in which the coil actuating member 51 is moved by the rack 36.

Carried by the coil actuating member 51, and mounted for rectilinear movement along the axis of the magnet 52, is a coil 55, here shown as slidingly mounted in the hollow core of a suitable bearing member 56 that may also be carried in any suitable way from the base of the U-shaped magnet 52. As illustrated in Fig. 2, the coil 55 is designed to take up a position at approximately the midpoint in the length of the arms of the U-shaped magnet 52 when the spring 54 is under neither tension nor compression. When the axle 16 is in rotation, however, the rotating magnetic field produced by the wheel-like members 31 and 32 exerts a torque on the disk 34 which is transmitted through the rack 36, the element 50 and the rectilinearly movable coil actuating member 51 to displace the coil 55 along the axis of the U-shaped magnet 52 by an amount which is exactly proportional to the instantaneous speed of rotation of the axle 16. As the coil 55 may be moved from its neutral position in either direction, the foregoing displacement of the coil 55 is in proportion to the instantaneous speed of rotation of the axle 16 whether the wheel 15 is going forward or backward, and the spring 54, by compression or tension depending upon the direction of the movement of the rack 36, balances the torque so created on the rotating disk 34.

As before noted, the coil 55 is mounted to travel along a line bisecting the space between the poles of the permanent magnet 52. As is well understood in the art, the magnetic field existing between the poles of a U-shaped magnet varies in strength along the line bisecting the space between the poles as a linear function of the distance from the base of the U-shaped magnet to approximately the plane of the pole faces. As the position of the coil 55 along this equi-potential line between the legs of the magnet is, at any given instant, in correspondence with the instantaneous velocity of the axle 16, the rate of change of the coil from one position to another along said equi-potential line is proportional to acceleration or deceleration at all points in the line. Hence, owing to the linearity of the foregoing function, the magnetomotive force generated in the coil 55 by its rate of displacement along said equi-potential line is the same for like increments of displacement whether at a given period of time there is a given deceleration of the axle from a high speed of the axle, say 100 miles per hour, or a low speed of the axle, say five miles per hour. In other words, for a constant value of deceleration the coil moves with constant velocity along its path and the velocity of its movement is proportional to the rate of change of rotational velocity, or angular deceleration or acceleration, of the wheel irrespective of the speed of rotation of said wheel at the instant when deceleration or acceleration begins.

Accordingly, if a constant velocity is imparted to the coil 55 along its line of travel a constant voltage will be induced in the coil for the length of that travel. Thereby a voltage is generated in the coil 55 which is proportional to the instantaneous deceleration or acceleration of the disk 34 and therefore the axle 16. This is illustrated in Fig. 6 showing a graph 60 plotted on deceleration in miles per hour per second and voltage generated in volts. As the position of the coil at any instant is determined by the instaneous velocity of the disk, the rate of change of position of the coil over a given period of time will be proportional to the deceleration of the disk. In decelerating, the coil moves over an indeterminate path the length of which is a function of the maximum velocity obtained by the disk before deceleration began. The U-shaped magnet 52 is so constructed that the length of the available path of movement of the coil is sufficient to take into consideration the maximum velocity to which the axle 16 is likely to attain. But as will be apparent from the graph of Fig. 6, a given deceleration will induce a predetermined voltage which will be the same at whatever point in the length of the graph the deceleration begins, whether near one end of the graph 60 or the other, so that the voltage induced is always proportional to the actual deceleration of the wheel 15. Thereby the voltage generated in coil 55, which may be taken therefrom by suitable leads 61, affords a signal or source of energy whose strength is exactly proportional to the actual deceleration of the wheel 15 at whatever speed of rotation of said wheel the deceleration begins.

A second accelerometer of any suitable construction is provided on the vehicle for the purpose of providing a signal which is proportional to the deceleration of the vehicle in translation or normal angular deceleration of the wheel, such as occurs during the time the wheel of the vehicle is in rolling contact with the track or roadbed and the braking force is not of such a character that slipping of the wheel occurs. Under these circumstances the normal deceleration and actual deceleration are the same.

One suitable accelerometer for responding to normal angular deceleration is shown in Fig. 5 which produces a continuous electromotive force output proportional to the deceleration of translation of the vehicle and hence to the normal deceleration of the wheel such as exists when only true rolling contact is maintained with the track. As here illustrated, a cylindrical iron coil 70 has a primary winding 71 embedded concentrically in its inner surface, one half of said winding being wound clockwise from one end to the center line of the core and the other half being wound anticlockwise from said center line to the opposite end of the core so as to provide two equal but oppositely wound sections. Connected across the terminals of this primary coil is an oscillator 72 (Fig. 8) in circuit with any suitable battery 73 or any other suitable source of direct current or alternating current generated in any suitable way on the vehicle. Concentrically disposed within the primary winding 71 interiorly of the core 70 is a soft iron spool 74 which carries a secondary winding 75 whose ends are shown as connected to like springs 76 and 77 that also act as electrical connections as well as function to hold the spool normally so that the center of the secondary winding on the spool is aligned with the plane of junction of the two sections of the aforesaid primary coil, i. e., at the point where the winding changes from clockwise to anticlockwise. The coils on the core and spool have the appropriate length and number of windings so that the terminal magnetomotive force existing on the secondary coil 75 when generated by movement of the spool lengthwise of the core will exactly equal the magnetomotive force derivable from the accelerometer which responds to actual deceleration, such as the device of Figs. 1 to 4, when both are responding to the same deceleration. In other words, when the normal and actual decelerations are the same the sources of energy generated by the two accelerometers are balanced. Spool 74 is rigidly centered within the primary coil 71 by shafts 78 and 79 which project in opposite directions from a piston 80 disposed in an oil cylinder 81 provided interiorly of the spool 74, said shafts at their outer extremities being guided in suitable bearings 83 and 84. Piston 80 is provided with the aperture 82 extending therethrough, and as the chambers at opposite sides of said piston are filled with oil, the piston 80 functions as a dash-pot to damp out any sudden displacement of the spool that is not the result of a true deceleration.

The spool 74 is normally held in its neutral position by the springs 76 and 77 with its medial plane coincident with the radial plane of junction between the two halves of the primary coil 71 as before explained. Upon a change of speed of translation of the vehicle in either direction the spool 74 is displaced axially of the primary coil 71 in one direction or the other, depending on the direction of movement of the vehicle, and against the resilience of the springs 76 and 77. The spool 74 being free as a seismic element to take up a position depending on the force of deceleration or acceleration existing at the core 70, the displacement of the spool 74 will be proportional to the rate of deceleration, and as the flux linking the primary and secondary windings will, on movement of the spool 74, cause an induced voltage in coil 75 which is proportional to the displacement of the spool, such induced voltage affords a signal which may be used for comparison with the signal derived from the accelerometer responsive to the actual deceleration of the wheel. The induced electromotive force in secondary 75 may be rectified by any suitable rectifier 85 (Fig. 8), synchronized with the oscillator 72, before it is applied to the signal comparing means of the control system.

Referring now to Fig. 8, wherein accelerometers of the form illustrated in Figs. 1 to 5 have been shown, although as will hereinafter appear the accelerometers of Fig. 10 are preferred, the truck wheels 15 are provided with any suitable brake mechanism 90 which may be actuated and released by the admission and exhaust of any suitable brake operating fluid in conformity with the principles of braking systems well known in the art, such as conventional brake levers and brake rigging (omitted for purposes of clarity) responsive to variations of pressure in a brake cylinder diagrammatically indicated at 91. Fluid under pressure is supplied to and released from the brake cylinder under the control of the operator of the car or train by any suitable type of control equipment, as pneumatic brake control equipment either of the automatic or the straight air type. For purposes of illustration, a simple operator type of brake control equipment of the straight air type has been shown, but it is to be expressly understood that any other suitable type of operator control equipment may be used.

As illustrated, train pipes 94 and 95 extend the length of each car and are connected through hose couplings 96 with successive cars in the train in a manner well understood in the art. Train pipe 94, which will hereinafter be referred to as the supply pipe, is constantly charged to a predetermined pressure corresponding to the pressure in reservoir 97, hereinafter referred to as the main reservoir, and which is connected to supply pipe 94 through a suitable connection 98. The fluid pressure in pipe 95, hereinafter referred to as the control pipe, is varied in accordance with the desired degree of brake application by a manually operated valve device 99 of the self-lapping type which is of well known construction and therefore will be referred to summarily by reference to its functions.

Brake valve device 99 includes an operating handle 100 effective upon rotary movement to actuate a rotary shaft for controlling the operation of suitable supply and release valves. With the brake handle 100 in its normal or brake release position, fluid under pressure is released from the control pipe 95 to atmosphere by way of a branch pipe 101 leading to the valve device 99 and thence to an exhaust pipe 102. When the brake handle 100 is shifted out of its brake release position into a zone of application, fluid under pressure is supplied from the supply pipe 94 to the control pipe 95 by way of a branch pipe 103 connecting the supply pipe 94 through said valve device 99 to the control pipe 95 via branch pipe 101. The character of the valve device 99 is such that the pressure of the fluid established in the control pipe 95 is substantially proportional to the degree of displacement of the brake handle 100 out of its brake release position. As is more or less conventional, the branch pipes 101 and 103 may be provided with valves so as to close said branch connections when it is desired to remove the valve device 99 from one car and operate the brakes from a similar valve device in another car of the train. The brake control equipment as so far described further includes a control valve 106, such as disclosed for example in the patent to E. E. Hewitt, No. 2,096,491, and an electromagnetically actuated valve 107 for controlling communication between the two portions of a branch pipe 108 leading from supply pipe 95 to said control valve 106. As the details of construction and operation of said control valve 106 are fully set forth in the aforesaid patent, said valve will be only described summarily herein by reference to its function.

Fluid supplied from the control pipe 95 through the branch pipe 108 to the control chamber of the control valve 106 is effective to operate the latter and effect a supply of fluid at a corresponding pressure, or any desired ratio of pressure to that in control pipe 95, to the brake cylinder 91 through pipe 109 from pipe 110 connecting supply pipe 94 with the control valve 106. As the valve 106 is, as before mentioned, of the self-lapping type, the supply of fluid under pressure to the brake cylinder 91 is automatically lapped or cut off when the pressure in the brake cylinder corresponds to or has a predetermined ratio to the pressure in the control pipe 95 as supplied to the control chamber of the valve 106.

The electromagnetically actuated valve 107 is diagrammatically illustrated as comprising a casing 112 having a chamber 113 formed therein in which is disposed a double seating valve 114. Valve 114 is biased by a coil spring 115 into an upper seated position in engagement with a valve seat 116 leading to an exhaust pipe 117. Valve member 114 may be moved against the tension of the spring 115 by an electromagnet or solenoid 118 to a position in which said valve member 114 engages a second seat 119 which controls the communication between the chambers 120 and 121 with which communicate the before mentioned portions of the pipe 108 leading from control pipe 95 to control valve 106. When valve member 114 is actuated by coil 118 against the tension of spring 115, valve member 114 engages seat 119 to break the communication between supply pipe 95 and valve 106. In this position the chamber 121 is open to exhaust through seat 116 and therefore the right-hand portion of the pipe 108 as viewed in Fig. 8, and which is in communication with valve 106, is thereby exhausted to atmosphere through a relatively large port which assures the release of pressure in the control chamber of the valve 106.

The coil 118 is energized by the operation of a relay 123 including two windings 124 and 125 wound differentially. Winding 125 as illustrated receives the signal derived from the accelerometer responsive to actual angular deceleration, here shown as mounted on the axle of the wheel as in Figs. 1 to 4, while winding 124 receives the signal proportional to actual deceleration derived from the accelerometer 70. The difference in excitation arising from the difference in electromotive forces existing in coils 124 and 125 operates the relay switch 126 to close the circuit through the coil 118, any suitable battery or other source of electric energy 127 being connected in circuit with said coil and relay, whereupon the valve member 114 is operated as described against the tension of the spring 115 to exhaust the fluid pressure from the valve 106 and thereby release the pressure in the brake actuating cylinder 91.

From the foregoing description it will now be apparent that a signal is applied to the coil 125 which is proportional to the actual deceleration as determined by the operation of the accelerometer hereinabove described in connection with Figs. 1 to 4. Similarly, a signal is applied to the coil 124 which is proportional to the normal deceleration of the wheel as reflected in the actual deceleration of the vehicle, remembering that the actual deceleration of the vehicle corresponds to the normal deceleration of the wheel if the wheel by reason of its contact with the track or other surface is decelerating only at that rate corresponding to the deceleration of the vehicle and therefore without slippage at the wheel. If the wheel begins to slip the actual rotational deceleration of the wheel increases to a value above that of the normal rotational deceleration of the wheel, whereby a differential electromotive force is imposed on the relay device 123 by the coils 124 and 125, whereupon the relay switch 126 is closed to energize the coil 118. Energization of coil 118 moves valve member 114 against the tension of the spring 115 to exhaust the control chamber of valve 106 to atmosphere as heretofore explained, whereby the pressure is therefore released at the brake cylinder 91. Hence the braking pressure is at once released on the occurrence of an actual rotary deceleration in excess of the normal rotary deceleration. As soon as slipping ceases, however, the normal and actual rotational decelerations again become equal, no differential electromotive force exists at the relay device 123, the relay switch 126 is opened, coil 118 is de-energized, and valve member 114 returns under the action of its spring 115 to restore communication between the control pipe 95 and the relay device 106. By the use of a suitable type of relay 123, premature actuation of the switch 126 before rolling contact is re-established can be prevented.

The foregoing operation is diagrammatically illustrated in Fig. 7 with some distortion of the graph to avoid confusion from closely spaced lines. The vehicle is assumed to be moving at velocity $v1$ until at time $t1$ the brake is applied. At first deceleration proceeds along the line 10 until time and velocity $v2$, $t2$ are reached. If the wheel now begins to slip the actual angular deceleration of the wheel is shown by the line 11 until at time $t3$ the actual angular velocity has dropped to $v3$. If, now, the brake is released the angular velocity of the wheel increases to normal angular velocity which is reflected at $v4$, $t4$ on line 12, line 12 being of less slope than line 10 on the assumption that the braking force when slipping of the wheel occurs is less than when rolling contact exists. The increment of time (t4—t3) is the time that the brake is released until rolling contact is re-established and then the brake is reapplied at time t4, and subsequent deceleration follows the line 13 which is parallel to line 10. It will be observed that the foregoing operation will occur whether slipping starts at the beginning of braking or only after a period of braking when, because of the change in coefficient of friction at the different speed, continuation of the same brake pressure may initiate slipping. Whenever during the braking period slipping is initiated, in other words, the difference in signals or sources of energy at the relay device 123 effects an immediate release of the brake, and then just as quickly as true rolling is re-established the brake pressure is reapplied, whereby maximum effectiveness of the brake system is maintained, utilizing to the fullest extent possible whatever friction exists between the wheel and its contacting surface.

While as so far described one particular form of accelerometer responsive to normal translational or normal angular deceleration and one particular form of accelerometer responsive to actual angular deceleration have been illustrated and described by way of exemplifying the broader principles and method of the present invention, other accelerometers for producing the signals to be compared may be used.

In fact the preferred accelerometer for obtaining a signal proportional to the translational or normal angular deceleration is illustrated in Fig. 10. As here shown, a device utilizing a principle similar to that of the slide wire potentiometer has been illustrated as comprising a cylindrical iron core 130 provided with a slide wire rheostat winding 131 composed of two halves, one half from its ends to the midpoint and the other half from said midpoint to the opposite end of the core so as to provide two equal sections. Disposed in the hollow interior of coil 131 is an inertia member 132 mounted on a rod 133 which extends slidably through the end members 134 of the core and is secured to clamps 135. Like springs 136 and 137 are interposed between said collars 138 and clamps 135. One of said springs may also constitute an electrical connection from a contact element 139 carried by inertia member 132 and the lead 140 of the signal circuit. The other lead 141 of the signal circuit is connected to a post 142 disposed at the plane of junction of the two halves of the winding 131. The halves of winding 131 are energized by batteries 143 connected to the center post 142 and the opposite ends of the respective halves.

The springs 136 and 137, when the vehicle is not accelerating or decelerating, hold the contact element 139 in its neutral position at the junction of the two halves of the coil 131. Upon occurrence of acceleration or deceleration, however, inertia member 132 moves against the resilience of said springs by an amount which is exactly proportional to the true acceleration or deceleration of the vehicle to which the core 130 is attached, whereupon contact element 139 produces in the external circuit 140, 141 an electromotive force as a source of energy which may be utilized as a signal at the coil 124 in Fig. 8 in the same manner as heretofore explained in conjunction with use of a signal from the accelerometer of Fig. 5.

Any other suitable accelerometer responsive to translational acceleration and deceleration may be used, such as a pressure potentiometer device working on the principle of a variable resistance responsive to changes of pressure, for example, as disclosed in the patent to Harrison No. 2,391,966, granted January 1, 1946.

In place of the device shown in Figs. 1 to 4 for obtaining a signal proportional to actual angular deceleration of the wheel axle it is preferred to employ a device of the type disclosed in the patent to Serrell No. 2,090,521, granted August 17, 1937 and diagrammatically illustrated in Fig. 10. As here shown, a rotor 145 of the squirrel cage type is driven from or synchronously with the axle of the car analogously as the embodiment of Figs. 1 and 4. Associated with said rotor are four poles 146, 147, 148 and 149 disposed at 90° apart. Direct current is supplied from any suitable battery or other source 150 to coils 152 and 154 on the opposed poles 148 and 149 through circuit connections 151, 153 and 155. The other two poles 146 and 147 are provided with coils 156 and 157, respectively, connected through leads 158, 159 and 160 so that a signal may be taken off from the leads 159 and 160 which constitute a pick-up circuit for a study of the quadrature flux set up by the currents induced in the rotor bars by the movement of these bars in the field set up by the direct current applied to coils 152 and 154 on poles 148 and 149. The voltage induced in these bars is proportional to the instantaneous velocity of rotation, and the current flows setting up the quadrature flux. This flux, as the velocity changes from one value to another, as in deceleration, in turn induces a voltage proportional to the rate of change of this flux in the pick-up windings 156 and 157. The voltage induced in the latter is therefore proportional to the deceleration of the rotor 145, which in turn is proportional to the actual deceleration of the wheel axle. In order to eliminate the transient effects interjected by the electrical characteristics or constants of the copper current-carrying loop in the rotor, the resistance of the rotor circuit may be increased and the inductance of that circuit decreased by making the pick-up iron circuit including the coils 156 and 157 of greater reluctance. This latter may be effected by decreasing the cross sectional area of the flux return path in the frame of the machine as well as by decreasing the cross sectional area of the poles 146 and 147 as illustrated. Thereby linearity of response under the varying speeds likely to be encountered is obtained.

Any other suitable accelerometer responsive to actual acceleration and deceleration may be used, as for example a device working on the principle disclosed in the patent to Kolff No. 2,364,256, granted December 5, 1944.

As before noted, the present invention also contemplates the provision of means for increasing the frictional contact between the wheel and its contacting surface when slippage starts, preferably simultaneously with the release of the brake, although as will be apparent to those skilled in the art the device to be described may be used if slippage occurs during acceleration and it also may be operated independently of the brake. Referring to Fig. 9, 162 is a container of any suitable character mounted on the frame of the vehicle in any suitable way as by bracket elements 163. Container 162 is provided with an outlet 164 controlled by a valve member 165 having a port 168 and connected by rod 166 to any suitable device for comparing the signals derived from the two accelerometers as heretofore explained, as for example the coil 118 of Fig. 8 or a separate like coil in the circuit. A spring 167 may be associated with the valve 165 to normally hold the parts in the position illustrated in Fig. 9. Upon actuation of the solenoid or other coil associated with the rod 166 the valve 165 is moved to align its aperture 168 with the outlet 164 so that sand or other suitable friction increasing material will flow through the delivery conduit 169 for application to the periphery of the wheel or to the surface contacted by the wheel immediately in front of the latter.

Fig. 10 further illustrates a system wherein the voltages produced by the two accelerometers are opposed to provide a differential voltage which is suitably amplified as by means of a thermionic valve to operate the electromagnetic valve 107 (Fig. 8) which controls the brake releasing and reapplying means. If preferred, the thermionic valve may replace the relay switch 126 of Fig. 8, or as shown in Fig. 10 the amplified current may be used to operate a less sensitive relay. As stated above, the voltage across the leads 159, 160 is proportional to the actual angular deceleration, and the voltage across the leads 140, 141 is proportional to the normal angular deceleration. These leads are connected to the terminals 170 so that the two voltages produced by the accelerometers are opposed to provide a differential voltage equal to the vector sum of the two voltages. The differential voltage is applied by leads 171 to a thermionic amplifier 172 of any suitable type and the current in the output circuit 173 of the amplifier energizes a suitable relay 174 adapted to close a switch 175 in the circuit of the solenoid 118 of the electromagnetic valve 107.

It will therefore be perceived that by the present invention a relatively simple and highly sensitive method and system have been provided for releasing a brake and effecting control over the degree of brake application instantaneously after slippage starts. In fact, the only limitation upon the promptness with which the brake control is instituted is imposed by the inertia effects of such movable parts as exist in the mechanical systems and the time response characteristic in the electromagnetic systems. As amplifiers may be introduced into either or both circuits, either before or after combination of the two signals in order to attain control, a very small difference in the sources of energy arising from the difference between the actual rotational velocity of the wheel with respect to its velocity of translation will result in the brake being released before the angular momentum of the wheel has been materially decreased. A method and system have thus been provided for comparing the normal angular deceleration with the actual angular deceleration which obviates the inaccuracy, as well as the complexity, implicit in the use of the inertia-operative mechanisms heretofore proposed. Thus the comparison of the values derived from the normal and actual angular decelerations of a wheel provides an accuracy of control that is independent of the existing conditions as to friction, the occurrence of any particular deceleration, the instantaneous speed at the instant when slippage starts, any arbitrary lapse of time or amount of slip, and other factors other than the existence of a decrease in the speed of the wheel below that which should exist for true rolling contact.

Use of the present invention also facilitates incorporation into the braking system of additional useful features. For example, in an accelerometer which is responsive to acceleration as well as deceleration, no advantage has been taken in the system so far described of the induced voltage due to acceleration. This induced voltage due to acceleration, when it has attained a predetermined value, can be used at any one wheel to release the brakes at some or all of the remaining wheels, so that by going through the motion of applying the brakes a spinning wheel may be locked to facilitate starting the vehicle if good traction exists at the other wheels.

The voltage induced in one or more of the accelerometers may also be used as a means of measuring speed. Speed being an integration of acceleration, any suitable circuit may be associated with an accelerometer for integrating the induced voltage—for example, a high resistance and capacity may be connected across the terminals of the accelerometer and speed may be determined from the integrating effect of such a system as measured across the capacity. Other useful auxiliary systems facilitated by the use of the present invention will be apparent to those skilled in the art.

While the embodiments of the invention illustrated on the accompanying drawings have been described with considerable particularity, it is to be expressly understood that the invention is not limited thereto, as the same is capable of receiving a variety of expressions some of which will now readily suggest themselves to those skilled in the art. While the invention has been particularly illustrated and described by reference to its use as a method or system for controlling brake application on wheeled vehicles of the type adapted to run on tracks, i. e., railways cars and trains, it will be apparent to those skilled in the art that the invention is of equal applicability to the control of brakes on automotive vehicles, such as trucks, tractors, automobiles, etc., wherein by use of the hereinbefore described accelerometers or other comparable devices for generating and comparing signals derived from and proportional to normal and actual angular deceleration of some or all of the wheels of the vehicle a braking effect on one or more of the wheels can be released to eliminate or minimize skidding and the like as soon as actual angular deceleration is predeterminately greater than normal angular deceleration for the then existing translational deceleration. Also, as will be apparent to those skilled in the art the invention is of even wider application than to brake systems, as where as in rolling mills, paper mills, etc., other systems of control are desired derivable from differences in normal and actual rotational deceleration or acceleration of the rolls.

While certain accelerometers have been described with considerable detail, it is expressly understood that other accelerometers for measuring either or both deceleration of translation and deceleration of rotation can be used. Various other systems for comparing and utilizing the sources of energy derived from the two accelerometers can be employed, certain features, as the automatic sanding means, may be used either with the braking control or separately as desired, and various changes may be made in the details of construction, arrangement, proportion, size, etc., and elements illustrated may be replaced by equivalent elements, without departing from the spirit of the present invention. For defining the present invention reference is therefore to be had to the appended claims wherein the deceleration corresponding to true rolling, with no slippage, will be identified as the normal angular deceleration, for comparison with the actual angular deceleration, by which is meant the actual deceleration of the wheel at any instant, the two being the same when slippage is absent, but immediately providing a differential as soon as slippage starts, release of the brake being made to depend only on the existence of such a differential from whatever cause or causes, followed by reapplication of the brake upon disappearance of said differential. It is also to be understood that said differential may be considered zero as a practical matter, although not mathematically so, until a resultant differential of sufficient magnitude in the sources of energy is generated to close a relay, operate a thermionic valve, actuate a solenoid or other electromagnetic actuator, or otherwise control the pressure of fluid in the brake cylinder for determining the application or release of the brake, or to actuate any other suitable means as an acceleration control or a deceleration control to control rotary speed.

It will be understood that the term "acceleration" in the following claims includes both positive accelerations and negative accelerations or decelerations, and that the term "accelerometer" includes devices responding to negative accelerations or decelerations as well as the positive accelerations.

What is claimed is:

1. In a system of the character described, in combination with a rotary member and mechanism for controlling the speed of rotation thereof, means for producing a source of energy proportional to the normal angular deceleration of said member, means for producing a source of energy proportional to the actual deceleration of said member, means for opposing said sources of energy to obtain a force which is proportional to the difference therebetween, and means operable by said force and acting to actuate said mechanism as soon as actual angular deceleration exceeds the normal angular deceleration.

2. In a device of the character described, in combination with a rotary member and mechanism for controlling the speed thereof, electrical means for producing an electromotive force which is proportional to the normal angular deceleration of said member, means for producing an electromotive force which is proportional to the actual angular deceleration of said member, means for opposing said electromotive forces to obtain a force proportional to the difference between said electromotive forces, and means responsive to said differential force and operatively connected to said mechanism for actuating the same.

3. In a braking system for wheeled vehicles, in combination with a rotatable wheel and brake mechanism for retarding said wheel, means for releasing and reapplying said brake mechanism, separate means for respectively producing sources of energy that are proportional to the normal angular deceleration and the actual angular deceleration of the wheel, means for opposing said sources of energy to produce a differential force, and means responsive to said differential force for actuating said first named means.

4. In a braking system for wheeled vehicles, in combination with a rotatable wheel and brake mechanism for retarding said wheel, means for releasing and reapplying said brake mechanism, means for supplying said wheel with friction-increasing material, an electrical system including separate means for producing electromotive forces that are respectively proportional to the normal angular deceleration and the actual angular deceleration of the wheel, means for opposing said electromotive forces to obtain a force which is proportional to the difference in values of said electromotive forces, and means operated by said last named force for actuating said releasing and reapplying means and said supplying means.

5. In a braking system for wheeled vehicles, in combination with a rotatable wheel and brake mechanism for retarding said wheel, means for releasing and reapplying said brake mechanism, means for comparing the actual angular deceleration of the wheel with the normal angular deceleration of said wheel, and means operable by a differential existing in said comparing means for actuating said first named means.

6. In a braking system for wheeled vehicles, in combination with a rotatable wheel and brake mechanism for retarding said wheel, means for releasing and reapplying said brake mechanism, means for generating a force that is proportional to the normal angular deceleration of the wheel, means for generating a force that is proportional to the actual angular deceleration of the wheel, means for creating a force that is proportional to the differential between said two first named forces and means operable by said last named means to actuate said first named means.

7. In a braking system for wheeled vehicles, in combination with a rotatable wheel and brake mechanism for retarding said wheel, means for releasing and reapplying said brake mechanism, means for producing electromotive forces that are always proportional to the actual angular deceleration and the normal angular deceleration of the wheel, means for opposing said electromotive forces to obtain a force which is proportional to the difference between said first named electromotive forces, and means operable by said last named force for actuating said first named means.

8. In a braking system for wheeled vehicles, in combination with a rotatable wheel and brake mechanism for retarding said wheel, means for releasing and reapplying said brake mechanism, and means operable on initiation of slippage of said wheel to actuate said first named means and including means for producing a response that is proportional to the actual angular deceleration of the wheel, means for producing a response that is proportional to the normal angular deceleration of the wheel, and means for producing a response that is proportional to the difference between said two responses and actuated as soon as the actual angular deceleration of said wheel exceeds the normal angular deceleration thereof for operating said first named means.

9. In a braking system for wheeled vehicles, in combination with a rotatable wheel and brake mechanism for retarding said wheel, means for releasing and reapplying said brake mechanism, and means operable on initiation of slippage of said wheel to actuate said first named means and including means responsive to the actual angular deceleration of said wheel for generating an electromotive force proportional to said actual angular deceleration, means responsive to the normal angular deceleration of said wheel for generating an electromotive force proportional to said normal angular deceleration, means for opposing said electromotive forces to obtain a differential upon the actual angular deceleration exceeding the normal angular deceleration of the wheel, and means responsive to said differential for operating said first named means.

10. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition to provide a differential force, and means actuated by said differential force for operating said first named means.

11. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition to provide a differential force, means energized by said differential force, and means actuated by said last named means for operating said first named means.

12. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the vehicle, a system into which said accelerometers are connected in opposition to provide a force proportional to the difference between the actual and normal deceleration of said wheel, means for supplying said wheel with friction-increasing material, and means actuated by said force for operating said first named means and said last named means.

13. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in balanced opposition when the actual and normal decelerations are the same, and means in said circuit actuated by a difference in the response of said accelerometers for operating said first named means.

14. In a braking system for wheeled vehicles, in combination with a rotatable wheel and brake mechanism for retarding said wheel, means for releasing and reapplying said brake mechanism, means for supplying friction-increasing material to said wheel, means operable on initiation of slippage of said wheel to actuate both of said first named means and including means productive of a response proportional to the actual angular deceleration of the wheel, means productive of a response proportional to the normal angular deceleration of the wheel, and means responsive to the responses of said two deceleration means and actuated by a difference in the values thereof for operating both of said first named means.

15. In a braking system for wheeled vehicles, in combination with a rotatable wheel and brake mechanism for retarding said wheel, means for releasing and reapplying said brake mechanism, means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition and including means to provide a differential force when the actual angular deceleration becomes greater than the normal angular deceleration, and means actuated by said force for operating said first named means.

16. In a braking system for wheeled vehicles, in combination with a rotatable wheel and brake mechanism for retarding said wheel, means for releasing and reapplying said brake mechanism, an electrical system including separate current inducing means for respectively producing responses that are proportional to changes in the normal angular and actual angular decelerations of the wheel, means for compounding the induced currents to establish a differential, and means operated by said differential for actuating said first named means.

17. In a braking system for wheeled vehicles, in combination with a rotatable wheel and brake mechanism for retarding said wheel, means for releasing and reapplying said brake mechanism, means for inducing voltages that are always proportional to the normal angular and the actual angular decelerations of the wheel, and means responsive to the vector sum of said voltages for actuating said first named means.

18. In a braking system for wheeled vehicles, in combination with a rotatable wheel and brake mechanism for retarding said wheel, means for releasing and reapplying said brake mechanism, means for inducing voltages that are always proportional to the actual angular and the normal angular decelerations of the wheel, an electrical circuit to which said voltages are applied in opposition, a relay in said circuit actuated by a differential in said voltages, and operative connections between said relay and said first named means.

19. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition to provide a differential voltage, means for amplifying said differential voltage, and means actuated by a predetermined differential voltage for operating said first named means.

20. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition to provide a differential voltage, and means actuated by a predetermined differential voltage for operating said first named means, said last named means including a thermionic tube and electrically operated means controlled by said tube for operating said first named means.

21. In a braking system for wheeled vehicles, in combination with a rotatable wheel and brake mechanism for retarding said wheel, means for releasing and reapplying said brake mechanism, and means operable on initiation of slippage of said wheel to actuate said first named means and including an accelerometer responsive to the actual angular deceleration of said wheel, a second accelerometer responsive to the normal angular deceleration of the wheel, a circuit into which said accelerometers are connected in opposition to provide a differential voltage, and means actuated by said differential voltage for operating said first named means, said accelerometer responsive to normal angular deceleration including a core carrying a coil composed of a pair of equal but oppositely wound sections, a spool carrying a winding and axially movable in said core, and yieldable means for normally holding the midplane of the winding on said spool in alignment with the junction of said first named coil sections but yieldable to permit axial displacement of said spool upon changes in inertia of said spool.

ALLISON R. WILLIAMS.

REFERENCES CITED

The following references are of record in the file of this patent:

UNITED STATES PATENTS

| Number | Name | Date |
| --- | --- | --- |
| 2,019,314 | Logan | Oct. 29, 1935 |
| 2,038,146 | Cook et al. | Apr. 21, 1936 |
| 2,132,914 | Fitch | Oct. 11, 1938 |
| 2,232,750 | Wilson | Feb. 25, 1941 |
| 2,232,752 | Wilson | Feb. 25, 1941 |
| 2,272,872 | Wilson | Feb. 10, 1942 |
| 2,294,602 | Hines | Sept. 1, 1942 |
| 2,294,610 | Sorensen | Sept. 1, 1942 |
| 2,308,894 | Place | Jan. 19, 1943 |
| 2,321,059 | Anderson | June 8, 1943 |
| 2,325,927 | Wilbur | Aug. 3, 1943 |
| 2,332,584 | McCune | Oct. 26, 1943 |
| 2,334,863 | Canetta | Nov. 23, 1943 |
| 2,393,031 | Eksergian | Jan. 15, 1946 |
| 2,435,310 | Hines | Feb. 3, 1948 |